US012795466B2

(12) United States Patent
Choi

(10) Patent No.: US 12,795,466 B2
(45) Date of Patent: Nov. 10, 2026

(54) METHOD AND APPARATUS FOR PERFORMING CONDITIONAL HANDOVER

(71) Applicant: UUCOM CO., LTD, Gwacheon (KR)

(72) Inventor: Suhan Choi, Gwacheon-si (KR)

(73) Assignee: UUCOM CO., LTD, Gwacheon (KR)

( * ) Notice: Subject to any disclaimer, the term of this patent is extended or adjusted under 35 U.S.C. 154(b) by 0 days.

(21) Appl. No.: 18/725,639

(22) PCT Filed: Nov. 3, 2022

(86) PCT No.: PCT/KR2022/017163
§ 371 (c)(1),
(2) Date: Dec. 18, 2024

(87) PCT Pub. No.: WO2023/128220
PCT Pub. Date: Jul. 6, 2023

(65) Prior Publication Data

US 2025/0301373 A1 Sep. 25, 2025

(30) Foreign Application Priority Data

Dec. 28, 2021 (KR) ........................ 10-2021-0189917
Nov. 2, 2022 (KR) ........................ 10-2022-0144131

(51) Int. Cl.
*H04W 36/00* (2009.01)
*H04W 36/08* (2009.01)
*H04W 36/38* (2009.01)

(52) U.S. Cl.
CPC ... *H04W 36/0058* (2018.08); *H04W 36/0077* (2013.01); *H04W 36/08* (2013.01); *H04W 36/38* (2013.01)

(58) Field of Classification Search
CPC ......... H04W 36/0072; H04W 36/0077; H04W 36/0085; H04W 36/00; H04W 36/0058;
(Continued)

(56) References Cited

U.S. PATENT DOCUMENTS

2022/0264389 A1* 8/2022 Naseer-Ul-Islam ......................... H04W 36/0072
2022/0345965 A1* 10/2022 Gürsu ............... H04W 36/0077
(Continued)

FOREIGN PATENT DOCUMENTS

KR 10-2018-0096762 A 8/2018
KR 10-2019-0077502 A 7/2019
(Continued)

OTHER PUBLICATIONS

3GPP TR 38.832 V17.0.0 (Jun. 2021).
(Continued)

*Primary Examiner* — Quoc Thai N Vu
(74) *Attorney, Agent, or Firm* — INVENSTONE PATENT, LLC

(57) ABSTRACT

The present invention relates to a method and apparatus for performing conditional handover. This specification discloses a method for performing conditional handover, comprising the steps of: receiving, from a source base station, a measurement configuration message including a threshold for triggering a measurement report message; transmitting, to the source base station, the measurement report message according to a measurement event criterion being satisfied based on the threshold; receiving, from the source base station, a conditional handover command message including information about at least one network slice provided by a neighboring base station; and transmitting, to the source base station, a response message to the conditional handover command message.

16 Claims, 10 Drawing Sheets

(58) Field of Classification Search
CPC ............. H04W 36/0064; H04W 36/08; H04W 36/362; H04W 36/38; H04W 48/18; H04W 36/0016; H04W 36/0061; H04W 36/00837
See application file for complete search history.

(56) References Cited

U.S. PATENT DOCUMENTS

| | | | | |
|---|---|---|---|---|
| 2023/0062362 A1* | 3/2023 | Sun | H04W 36/00 | |
| 2023/0217280 A1* | 7/2023 | Wallentin | H04W 52/0229 | 370/252 |

FOREIGN PATENT DOCUMENTS

| | | | |
|---|---|---|---|
| KR | 10-2019-0139848 | A | 12/2019 |
| KR | 10-2020-0125970 | A | 11/2020 |
| KR | 10-2021-0021605 | A | 2/2021 |
| KR | 10-2021-0091221 | A | 7/2021 |
| KR | 10-2021-0123434 | A | 10/2021 |
| KR | 10-2021-0152940 | A | 12/2021 |
| WO | 2020/200469 | A1 | 10/2020 |

OTHER PUBLICATIONS

Outlook 21 (Nov. 2017).

Decision to grant of the Korean Patent Application No. 10-2022-0144131 (Issued Date: May 9, 2025).

Ericsson: "TP to 38.300 on Conditional Handover in NR", 3GPP Draft; R2-1906219—TP To 38.300 On Conditional Handover in NR, 3rd Generation Partnership Project (3GPP), Mobile Competence Centre ; 650, Route Des Lucioles ; F-06921 Sophia-Antipolis Cedex ; FR, vol. RAN WG2, No. Reno, US; May 13, 2019-May 17, 2019 May 13, 2019 (May 13, 2019), XP051729691.

Intel Corporation: "Running CR for the introduction of NR mobility enhancement", 3GPP Draft; R2-1909571 Running Stage 2 CR, 3rd Generation Partnership Project (3GPP), Mobile Competence Centre ; 650, Route Des Lucioles ; F-06921 Sophia-Antipolis Cedex ; FRANCE vol. RAN WG2, No. Prague, Czech Republic; Aug. 26, 2019-Aug. 30, 2019 Aug. 16, 2019 (Aug. 16, 2019), XP051767366.

"3rd Generation Partnership Project; Technical Specification Group RAN; NR; Study on enhancement of Radio Access Network (RAN) slicing (Release 17)", 3GPP Standard; Technical Report; 3GPP TR 38.832, 3rd Generation Partnership Project (3GPP), Mobile Competence Centre ; 650, Route Des Lucioles ; F-06921 Sophia-Antipolis Cedex ; France, No. V17.0.0 Jul. 9, 2021 (Jul. 7, 2021), pp. 1-31, XP052030264.

* cited by examiner

METHOD AND APPARATUS FOR PERFORMING CONDITIONAL HANDOVER

CROSS-REFERENCE TO RELATED APPLICATIONS

This application is a National Stage filing under 35 U.S.C. 371 of International Application No. PCT/KR2022/017163, filed on Nov. 3, 2022, which claims the benefit of earlier filing date and right of priority to Korean Application No. 10-2021-0189917, filed on Dec. 28, 2021, and Korean Application No. 10-2022-0144131, filed on Nov. 2, 2022 in the Korean Intellectual Property Office, the contents of which are all hereby incorporated by reference herein in their entirety.

BACKGROUND OF THE DISCLOSURE

Technical Field

The present invention relates to a wireless communication system, and more particularly to a method and apparatus for performing conditional handovers.

Background Art

3GPP finalized the first global 5G New Radio (NR) standard in Release (Rel)-15, paving the way for the commercial application of 5G. 5G NR is a radio access technology that provides improved data transmission rates compared to LTE Evolved UMTS Terrestrial Radio Access (E-UTRA) and can satisfy various QoS requirements for granular and specific usage scenarios. In particular, eMBB (enhanced Mobile Broadband), mMTC (massive Machine-Type Communications), and URLLC (Ultra-Reliable and Low Latency Communications) have been defined as representative usage scenarios for 5G. To meet the requirements of each scenario, a flexible (scalable) numerology is provided compared to LTE.

Additionally, network slicing technology is being considered for 5G mobile communications. Network slicing is a new concept applied to 5G mobile communications that enables attributes such as network isolation, customization, and independent management and orchestration to be applied to the radio access network (RAN) and core network (CN) of mobile communications. This is achieved by creating and providing network resources and network functions as independent slices of end-to-end (E2E) resources across the RAN and CN for each service.

Communication technology is evolving to create network slices optimized for each application's characteristics within a single large network, by integrating advancements in technologies such as Network Function Virtualization (NFV) and Software Defined Network (SDN).

Network slicing creates logically separated end-to-end (E2E) networks (i.e., network slices) over a single physical network, encompassing radio access, transmission, and 5G core equipment. This provides dedicated networks specialized for various services with different characteristics and Quality of Service (QoS) requirements. In other words, network slicing is a technology that provides the network resources and network functions required for the services requested by a User Equipment (UE) in one independent slice.

In a communication system, a UE may change its connected cell through a handover procedure or a cell (re) selection procedure. Generally, a base station may provide a single cell or multiple cells. Handovers can occur between cells belonging to the same base station or between cells belonging to different base stations.

In the handover procedure, the UE may measure the strength of signals received from neighboring cells (or base stations) and report the measurement results to the source cell (or base station). The source cell may receive the measurement results from the UE and select a target cell for handover based on these results. If the selected target cell is ready for handover, the source cell may transmit a handover (HO) command message to the UE, instructing it to hand over to the target cell. Upon receiving the HO command message, the UE can perform the connection procedure with the target cell.

If the signal measurement results for multiple neighboring cells are not delivered to the source cell in real-time, or if the received signal strength of the target cell is lower than that of other neighboring cells at the time of handover execution, the handover may fail. Alternatively, after completing the handover to the target cell, another handover may be performed to a neighboring cell with a stronger received signal strength than the target cell.

SUMMARY OF THE DISCLOSURE

The technical objective of the present invention is to provide a method and apparatus for performing conditional handovers.

Another technical objective of the present invention is to provide a method and apparatus for performing conditional handovers in UEs and base stations with applied network slicing.

A method of performing a conditional handover (CHO) by a UE in a wireless communication system supporting network slicing, the method comprising: receiving, from a source base station, a measurement configuration message comprising a threshold for triggering a measurement report message; transmitting, to the source base station, the measurement report message in response to a measurement event criterion being satisfied based on the threshold; receiving, from the source base station, a conditional handover command message comprising information about at least one network slice provided by a neighbor base station; and transmitting, to the source base station, a response message to the conditional handover command message.

In one aspect, the information about the at least one network slice may include information about at least one first network slice admitted to the UE, among multiple network slices provided by the neighboring base station.

In another aspect, the response message may include selection information indicating a network slice selected by the UE from the at least one first network slice, or the UE's confirmation of the information about the at least one network slice.

In another aspect, the selected network slice may be determined based on at least one of the at least one first network slice and a second network slice provided by the source base station.

In another aspect, if the at least one first network slice is of the same kind as the second network slice, the selected network slice may be the second network slice.

In another aspect, if the UE does not support the at least one first network slice, the selection information may include information indicating "no applicable slice".

In another aspect, the information indicating "no applicable slice" may have a value of 'O' or 'null'.

In another aspect, if the at least one first network slice does not include a network slice of the same type as the second network slice, the selected network slice may be determined based on priority or randomly.

In another aspect, the method may further comprise: determining if a handover trigger condition to the neighboring base station is met; and, if the handover trigger condition is met, performing a handover to the selected network slice provided by the neighboring base station.

In another aspect, the at least one first network slice information includes a network slice ID, and the conditional handover command message further includes single-network slice selection assistance information (S-NSSAI), wherein the S-NSSAI may include a Slice/Service Type (SST) field and a Service Differentiator (SD) field.

According to another aspect of the invention, a UE performing a conditional handover in a wireless communication system supporting network slicing is provided. The UE comprises: a transceiver configured to receive a measurement configuration message including a threshold for triggering a measurement report message from a source base station, transmit the measurement report message to the source base station when a measurement event criterion is satisfied based on the threshold, receive a conditional handover command message including information about at least one network slice provided by a neighbor base station from the source base station, and transmit a response message to the conditional handover command message to the source base station; and a processor configured to perform a handover to a first network slice among the at least one network slice provided by the neighbor base station based on a handover trigger condition being satisfied.

In one aspect, the information about the at least one network slice may include information about at least one first network slice admitted to the UE, among multiple network slices provided by the neighboring base station.

In another aspect, the response message may include selection information indicating a network slice selected by the processor from the at least one first network slice, or the UE's acknowledgment of the information about the at least one network slice.

In another aspect, the selected network slice may be determined based on at least one of the at least one first network slice and a second network slice provided by the source base station.

In another aspect, if the at least one first network slice is of the same kind as the second network slice, the selected network slice may be the second network slice.

In another aspect, if the UE does not support the at least one first network slice, the selection information may include information indicating "no such slice".

In another aspect, the information indicating "no such slice" above may have a value of '0' or 'null'.

In another aspect, if the at least one first network slice does not comprise the same kind of network slices as the second network slice, the selected network slice may be determined based on a priority or randomly.

In another aspect, the processor is configured to determine whether the handover trigger condition to the neighboring base station is satisfied, and to carry out a handover to the selected network slice provided by the neighboring base station if the condition is met.

According to yet another aspect of the present invention, a method of performing a conditional handover (CHO) by a source base station in a wireless communication system supporting network slicing is provided. The method comprises: transmitting a measurement configuration message including a threshold for triggering a measurement report message to a UE; receiving the measurement report message from the UE when a measurement event criterion is satisfied based on the threshold; determining a conditional handover for the UTE; transmitting a handover request message including a request for information about network slices to a neighbor base station; receiving an acknowledgment response message including information about at least one network slice provided by the neighbor base station; transmitting a conditional handover command message including information about the at least one network slice to the UE; and receiving a response message to the conditional handover command message from the UE.

The apparatus and methods of the present invention have the effect of enabling separate transmission of control information, including system information, for example, for each slice for RAN slicing. According to one aspect, each slice (e.g., including eMBB, URLLC, mMTC, V2X slice, etc.) may be assigned a unique ID, and may be configured such that different services or slices are distinguished by the respective slice IDs. This has the effect of enabling information to be transmitted based on the slice IDs, for example, in transmitting system information assigned to each slice.

DETAILED DESCRIPTION OF THE DISCLOSURE

Figure 1:
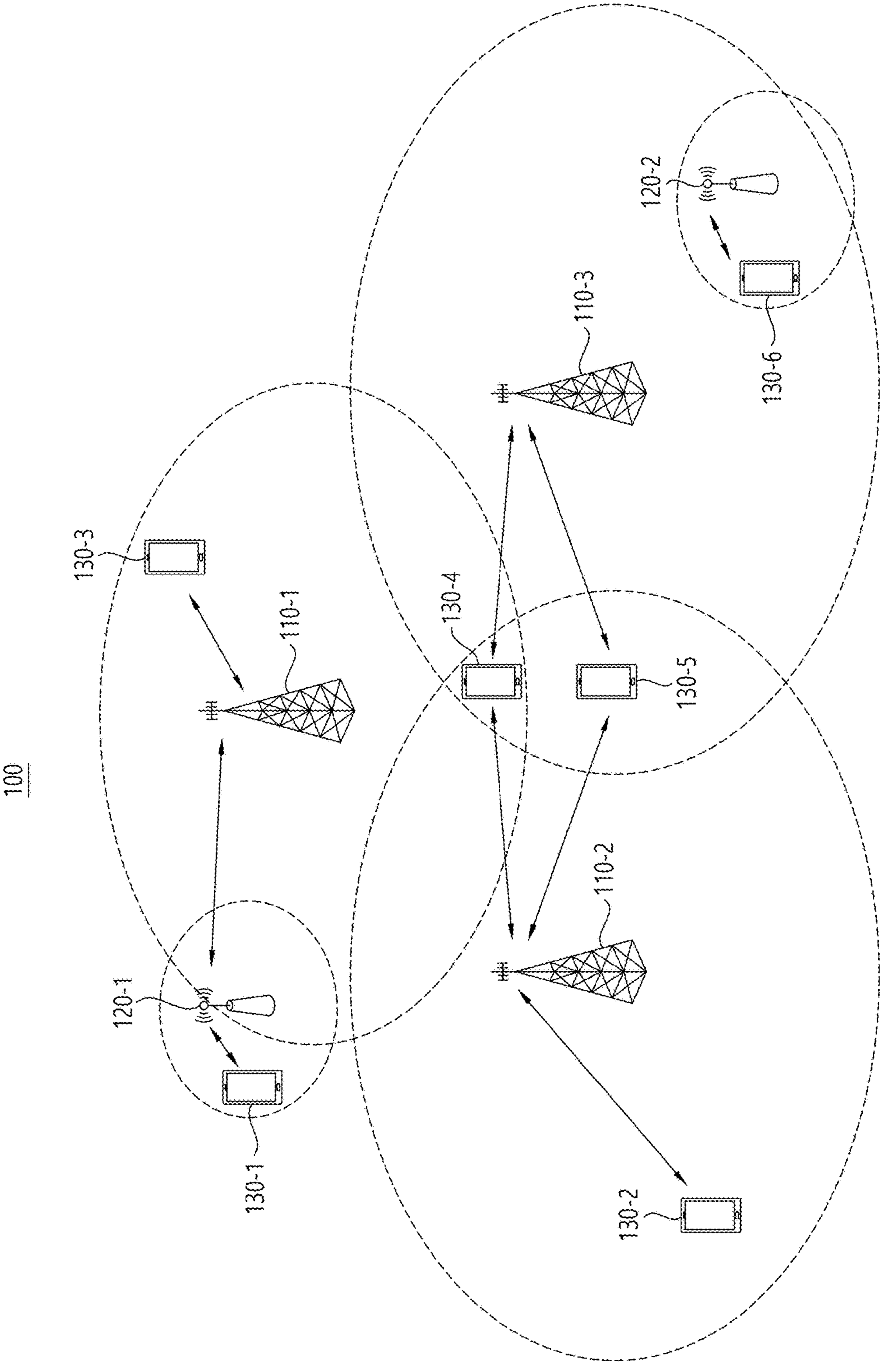
FIG. 1 is a conceptual diagram illustrating a wireless communication system according to an embodiment of the present invention.

The invention is subject to various modifications and may have many embodiments, certain embodiments of which are illustrated in the drawings and described in detail in the accompanying description. However, this is not intended to limit the invention to any particular embodiment, and is to be understood to include all modifications, equivalents, or substitutions that fall within the scope of the thought and skill of the present invention. In the description of the respective drawings, like reference numerals are used for like components.

As used herein, the terms “first,” “second,” “A,” “B,” and the like may be used to describe various components, but the components are not to be limited by such terms.

These terms are used only for the purpose of distinguishing one component from another.

For example, a first component may be named a second component, and similarly, a second component may be named a first component, without departing from the scope of the present invention. In addition, the term “and/or” includes any combination of a plurality of related recited items or any one of a plurality of related recited items.

When a component is referred to as being “connected” or “plugged into” another component, it should be understood that it may be directly connected or plugged into that other component, but there may be other components in between. On the other hand, when a component is the to be “directly connected” or “directly connected” to another component, it should be understood that there are no other components in between.

As used herein, a forward slash (/) or comma (comma) may mean “and/or”. For example, “A/B” can mean “A and/or B”. Accordingly, “A/B” can mean “only A”, “only B”, or “both A and B”. For example, “A, B, C” can mean “A, B, or C”.

As used herein, the expression “at least one of A and B” may mean “only A”, “only B”, or “both A and B”. In addition, the expression “at least one of A or B” or “at least one of A and/or B” can be interpreted interchangeably with “at least one of A and B” as used herein.

Also, as used herein, “at least one of A, B and C” may mean “only A”, “only B”, “only C”, or “any combination of A, B and C”. Also, “at least one of A, B or C” or “at least one of A, B and/or C” can mean “at least one of A, B and C”.

In addition, parentheses used herein may mean “for example”. Specifically, where “control information (PDCCH)” is indicated, “PDCCH” is suggested as an example of “control information”. In other words, “control information” in this specification is not limited to “PDCCH”, but rather “PDCCH” may be suggested as an example of “control information”. Also, even when labeled as “control information (i.e., PDCCH),” “PDCCH” may be suggested as an example of “control information.”

The terminology used in this specification is used to describe particular embodiments only and is not intended to limit the invention. Expressions in the singular include the plural unless the context clearly indicates otherwise. In this specification, the terms “including” or “having” and the like are intended to designate the presence of the features, numbers, steps, actions, components, parts, or combinations thereof described herein, and are not intended to preclude the possibility of the presence or addition of one or more other features, numbers, steps, actions, components, parts, or combinations thereof.

Unless otherwise defined, terms used in this specification, including technical or scientific terms, have the same meaning as commonly understood by one of ordinary skill in the art to which the invention belongs. Terms such as those defined in commonly used dictionaries should be construed to have meanings consistent with their meaning in the context of the relevant art and are not to be construed in an idealized or unduly formal sense unless expressly defined herein.

Hereinafter, preferred embodiments according to the present invention will be described in detail with reference to the accompanying drawings.

FIG. 1 is a conceptual diagram illustrating a wireless communication system according to an embodiment of the present invention.

Referring to FIG. 1, the wireless communication system 100 may include a plurality of communication nodes 110-1, 110-2, 110-3, 120-1, 120-2, 130-1, 130-2, 130-3, 130-4, 130-5, 130-6.

Each of the plurality of communication nodes may support at least one communication protocol. For example, each of the plurality of communication nodes may support a communication protocol based on code division multiple access (CDMA), a communication protocol based on wideband CDMA (WCDMA), a communication protocol based on time division multiple access (TDMA), a communication protocol based on frequency division multiple access (FDMA), OFDM (Orthogonal Frequency Division Multiplexing) based communication protocols, OFDMA (Orthogonal Frequency Division Multiple Access) based communication protocols, SC (Single Carrier)-FDMA based communication protocols, NOMA (Non-Orthogonal Multiple Access) based communication protocols, SDMA (space division multiple access) based communication protocols, etc.

The wireless communication system 100 may include a plurality of base stations 110-1, 110-2, 110-3, 120-1, 120-2, and a plurality of UEs 130-1, 130-2, 130-3, 130-4, 130-5, 130-6.

Each of the first base station (110-1), the second base station (110-2), and the third base station (110-3) may form a macro cell. Each of the fourth base station (120-1) and the fifth base station (120-2) may form a small cell. The fourth base station (120-1), the third UE (130-3), and the fourth UE (130-4) may fall within the coverage of the first base station (110-1). The second UE (130-2), the fourth UE (130-4), and the fifth UE (130-5) may fall within the coverage of the second base station (110-2). The fifth base station (120-2), the fourth UE (130-4), the fifth UE (130-5), and the sixth UE (130-6) may fall within the coverage of the third base station (110-3). The first UE (130-1) may fall within the coverage of the fourth base station (120-1). The sixth UE (130-6) may fall within the coverage of the fifth base station (120-2).

Each of the plurality of base stations (110-1, 110-2, 110-3, 120-1, 120-2) may be referred to as a NodeB, evolved NodeB, next generation Node B (gNB), next generation 6G base station, base transceiver station (BTS), radio base station, radio transceiver, or radio transceiver, An access point, access node, road side unit (RSU), digital unit (DU), cloud digital unit (CDU), radio remote head (RRH), radio unit (RU), transmission point (TP), transmission and reception point (TRP), relay node, and the like may be referred to. Each of the plurality of UEs 130-1, 130-2, 130-3, 130-4, 130-5, 130-6 may be referred to as a UE, access UE, mobile UE, station, subscriber station, mobile station, mobile station, portable subscriber station, node, device, etc.

Each of the plurality of communication nodes 110-1, 110-2, 110-3, 120-1, 120-2, 130-1, 130-2, 130-3, 130-4, 130-5, 130-6 may support cellular communications (e.g., long term evolution (LTE), LTE-A (advanced), New Radio (NR), 6G Radio Access Technology, etc. as defined by 3rd generation partnership project (3GPP) standards). Each of the plurality of base stations 110-1, 110-2, 110-3, 120-1, 120-2 may operate in a different frequency band, or may operate in the same frequency band. Each of the plurality of base stations 110-1, 110-2, 110-3, 120-1, 120-2 may be connected to each other via an ideal backhaul or non-ideal backhaul, and may exchange information with each other via the ideal backhaul or non-ideal backhaul. Each of the plurality of base stations 110-1, 110-2, 110-3, 120-1, 120-2 may be connected to the core network (rural) via IDUL backhaul or non-IDUL backhaul. Each of the plurality of base stations 110-1, 110-2, 110-3, 120-1, 120-2 may transmit signals received from the core network to the corresponding UE 130-1, 130-2, 130-3, 130-4, 130-5, 130-6, and may transmit signals received from the corresponding UE 130-1, 130-2, 130-3, 130-4, 130-5, 130-6 to the core network.

Each of the plurality of base stations 110-1, 110-2, 110-3, 120-1, 120-2 may support OFDM-based downlink transmission. Further, each of the plurality of base stations 110-1, 110-2, 110-3, 120-1, 120-2 may support uplink transmission based on OFDM or DFT-Spread-OFDM. Further, each of the plurality of base stations 110-1, 110-2, 110-3, 120-1, 120-2 may support multiple input multiple output (MIMO) transmission (e.g., single user (SU)-MIMO, multiple user (MU)-MIMO, massive MIMO, etc.), coordinated multipoint (CoMP) transmission, carrier aggregation transmissions, transmissions in unlicensed bands, device to device (D2D) communications (or proximity services (ProSe)), and the like. Here, each of the plurality of UEs 130-1, 130-2, 130-3, 130-4, 130-5, 130-6 may perform operations corresponding to the base stations 110-1, 110-2, 110-3, 120-1, 120-2 and/or operations supported by the base stations 110-1, 110-2, 110-3, 120-1, 120-2.

For example, the second base station 110-2 may transmit signals to the fourth UE 130-4 based on the SU-MIMO method, and the fourth UE 130-4 may receive signals from the second base station 110-2 by the SU-MIMO method. Alternatively, the second base station 110-2 may transmit signals to the fourth UE 130-4 and the fifth UE 130-5 based on the MU-MIMO method, and each of the fourth UE 130-4 and the fifth UE 130-5 may receive signals from the second base station 110-2 based on the MU-MIMO method. Each of the first base station 110-1, the second base station 110-2, and the third base station 110-3 may transmit signals to the fourth UE 130-4 based on the CoMP method, and the fourth UE 130-4 may receive signals from the first base station 110-1, the second base station 110-2, and the third base station 110-3 based on the CoMP method. Each of the plurality of base stations 110-1, 110-2, 110-3, 120-1, 120-2 may transmit and receive signals based on the CA method with the UEs 130-1, 130-2, 130-3, 130-4, 130-5, 130-6 within its coverage area.

Each of the first base station 110-1, the second base station 110-2, and the third base station 110-3 may coordinate the D2D communication between the fourth UE 130-4 and the fifth UE 130-5, and each of the fourth UE 130-4 and the fifth UE 130-5 may perform the D2D communication by the coordination of each of the second base station 110-2 and the third base station 110-3.

Hereinafter, among the communication nodes, even when a method (e.g., transmitting or receiving a signal) performed by a first communication node is described, a second communication node corresponding thereto may perform a method (e.g., receiving or transmitting a signal) corresponding to the method performed by the first communication node. That is, when an operation of a UE is described, a base station corresponding thereto may perform an operation corresponding to the operation of the UE. Conversely, if the behavior of a base station is described, the corresponding UE can perform an action that corresponds to the behavior of the base station.

Also, in the following, downlink (DL) refers to communication from the base station to the UE, and uplink (UL) refers to communication from the UE to the base station. In a downlink, the transmitter may be part of the base station and the receiver may be part of the UE. In an uplink, the transmitter is part of the UE and the receiver can be part of the base station.

In recent years, the rapid proliferation of smartphones and Internet of Things (IoT) devices has led to an increase in the amount of information being sent and received over communication networks. As a result, next-generation radio access technologies need to consider environments (e.g., enhanced mobile broadband communication) that provide faster service to more users than conventional communication systems (or conventional radio access technologies). To this end, the design of communication systems that consider machine type communication (MTC), which connects multiple devices and objects to provide services, is being discussed. In addition, the design of communication systems that consider services and/or UEs that are sensitive to reliability and/or latency of communication, such as Ultra-Reliable and Low Latency Communication (URLLC), is also being discussed.

Hereinafter, for ease of description, the next generation radio access technology is referred to as New Radio Access Technology (New RAT), and the wireless communication system to which the New RAT is applied is referred to as a New Radio (NR) system. As used herein with reference to NR, frequencies, frames, subframes, resources, resource blocks, regions, bands, subbands, control channels, data channels, synchronization signals, reference signals, signals, or messages may be construed in any of their respective meanings as used in the past, present, or future.

Figure 2:
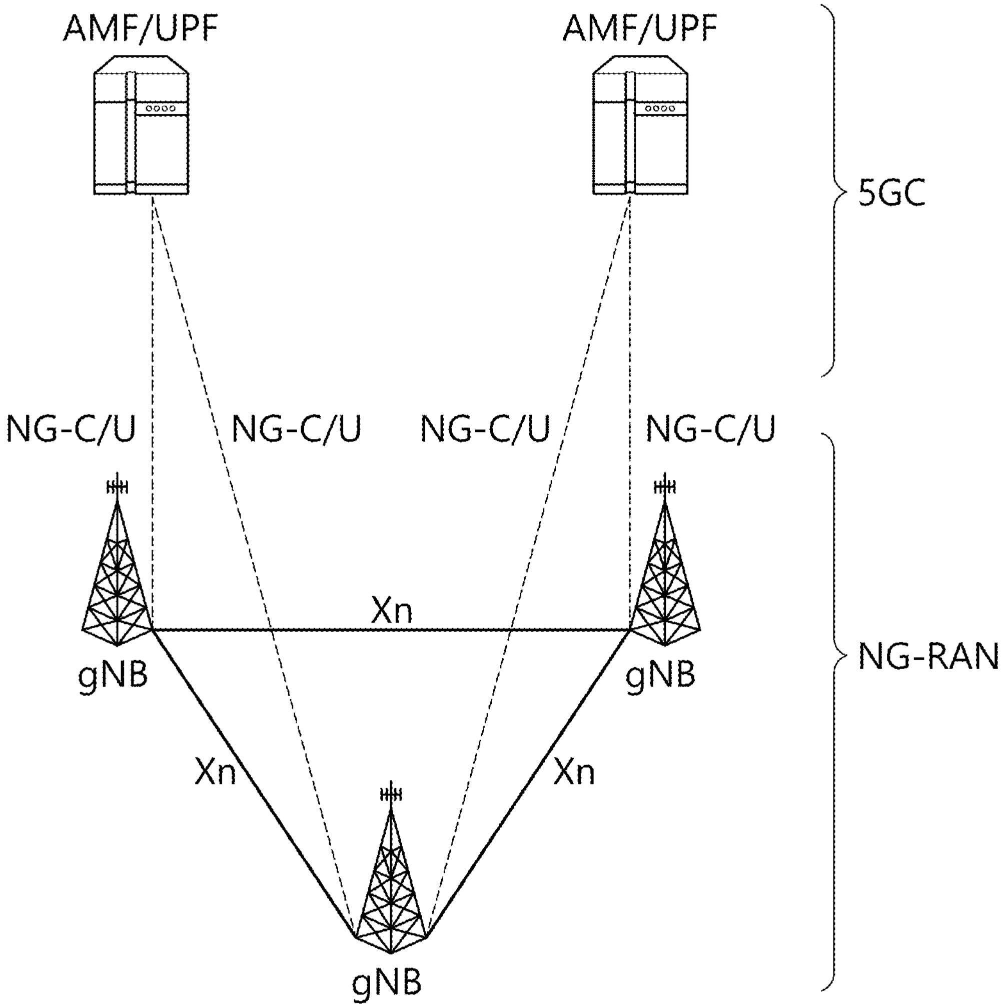
FIG. 2 is an illustrative diagram of a 5G system to which a data transmission method according to an embodiment of the present invention may be applied.

FIG. 2 is an illustrative diagram of an NR system to which a data transfer method according to an embodiment of the present invention may be applied. [0067]5G, as standardized by 3GPP, is a radio access technology that provides enhanced data rates compared to LTE and can satisfy various QoS requirements for granular and specific usage scenarios. In particular, enhanced Mobile Broadband (eMBB), massive Machine-Type Communications (mMTC), and Ultra-Reliable and Low-Latency Communications (URLLC) have been defined as representative usage scenarios for NR. To meet the requirements of each scenario, a flexible frame structure is provided compared to LTE. The frame structure of 5G NR supports multiple subcarrier-based frame structures. The basic SubCarrier Spacing (SCS) is 15 kHz, and a total of 5 types of SCS are supported, calculated as 15 kHz*2^n (where n=0, 1, 2, 3, 4).

Referring to FIG. 2, the Next Generation-Radio Access Network (NG-RAN) consists of gNBs that provide the NG-RAN user plane (SDAP/PDCP/RLC/MAC/PHY) and control information (RRC) protocol termination to the UE. Where NG-C represents the control plane interface used for the NG2 reference point between the NG-RAN and the 5th Generation Core (5GC). NG-U represents the user plane interface used for the NG3 reference point between the NG-RAN and the 5GC.

The gNBs are interconnected via the Xn interface and connected to the 5GC via the NG interface. More specifically, the gNBs are connected to the Access and Mobility Management Function (AMF) via the NG-C interface and to the User Plane Function (UPF) via the NG-U interface.

In the NR system of FIG. 2, multiple numerologies may be supported. Here, the numerology may be defined by subcarrier spacing and cyclic prefix (CP) overhead. In this case, multiple subcarrier spacings can be derived by scaling the base subcarrier spacing by an integer. Furthermore, the used numerology can be selected independently of the frequency band, even if it is assumed that very low subcarrier spacing is not utilized at very high carrier frequencies.

In addition, NR systems can support a variety of frame structures based on different numerologies.

<NR Waveforms, Numerology, and Frame Structure>

NR uses CP-OFDM waveforms with cyclic prefixes for downlink transmission and CP-OFDM or DFT-S-OFDM for uplink transmission. OFDM technology can be easily combined with MIMO (Multiple Input Multiple Output) and has the advantage of using low complexity receivers with high frequency efficiency.

On the other hand, since NR has different requirements for data rate, latency, coverage, etc. for each of the three scenarios, it is necessary to efficiently satisfy the requirements of each scenario through the frequency bands that comprise an arbitrary NR system. For this purpose, a technique for efficiently multiplexing multiple radio resources based on different numerology is proposed.

Specifically, the NR transmission numerology is determined based on the sub-carrier spacing and the cyclic prefix (CP), which varies exponentially with a value of 2 at 15 kHz, as shown in Table 1 below.

TABLE 1

| μ | Subcarrier spacing(KHz) | Cyclic Prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

As shown in Table 1 above, NR numerology can be categorized into five types based on the subcarrier spacing. This differs from LTE, one of the 4G communication technologies, where the subcarrier spacing is fixed at 15 kHz. Specifically, in NR, the subcarrier spacing used for data transmission is 15, 30, 60, and 120 kHz, while for synchronization signal transmission it is 15, 30, 120, and 240 kHz. Additionally, the extended CP is only applied to the 60 kHz subcarrier spacing. The frame structure in NR defines a frame with a length of 10 ms, composed of 10 subframes each 1 ms long. A frame can be divided into two 5 ms half-frames, each containing 5 subframes. For 15 kHz subcarrier spacing, one subframe consists of one slot, and each slot consists of 14 OFDM symbols. <NR physical resources> Regarding physical resources in NR, the following are considered: antenna port, resource grid, resource element, resource block, bandwidth part, etc.

Antenna ports are defined such that the channel carrying a symbol on an antenna port can be inferred from the channel carrying another symbol on the same antenna port. Two antenna ports are said to be in a quasi co-located or quasi co-location (QC/QCL) relationship if the large-scale properties of the channel carrying symbols on one antenna port can be inferred from the channel carrying symbols on the other antenna port. In this context, the large-scale properties include one or more of Delay spread, Doppler spread, Doppler shift, Average Delay, and Spatial Rx parameters.

Figure 3:
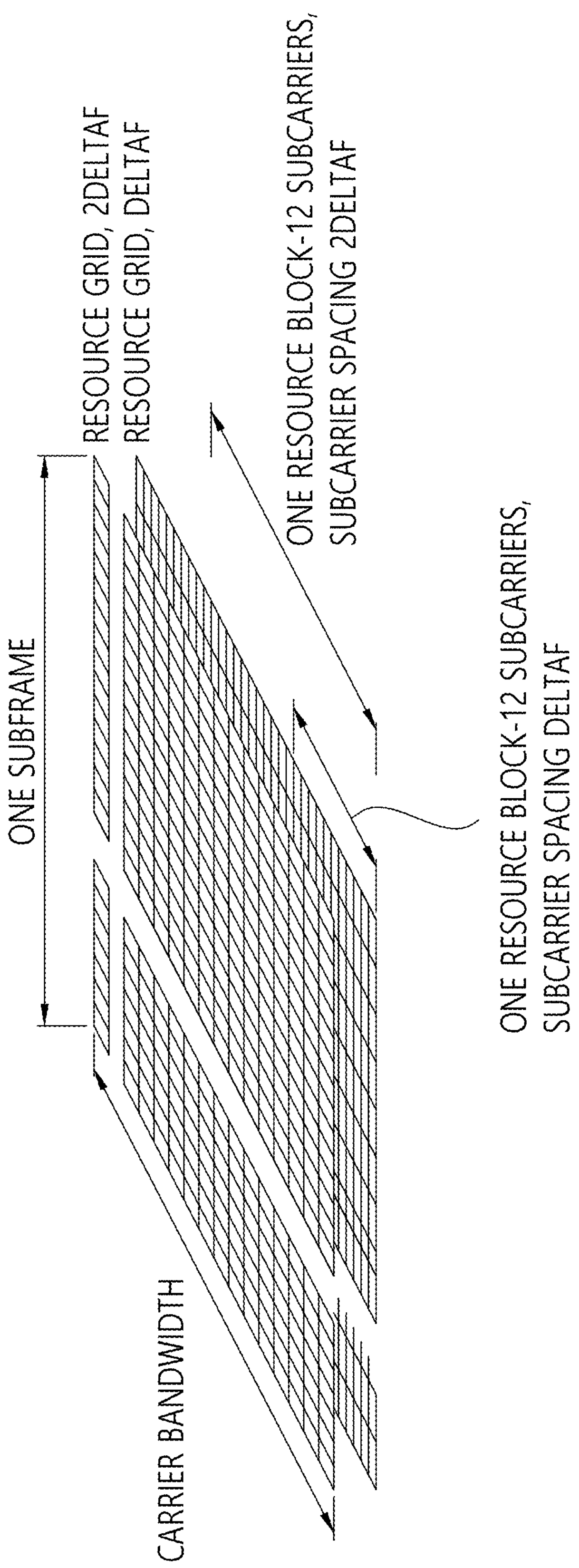
FIG. 3 is a drawing to illustrate a resource grid supported by radio access technology (RAT) to which the present invention may be applied.

FIG. 3 is a diagram illustrating the resource grid supported by radio access technology to which the present invention may be applied.

Referring to FIG. 3, a resource grid may exist for each numerology because NR supports multiple numerologies on the same carrier. Additionally, resource grids may exist based on antenna port, subcarrier spacing, and transmission direction.

A resource block consists of 12 subcarriers and is defined only in the frequency domain. Furthermore, a resource element consists of one OFDM symbol and one subcarrier. Thus, as shown in FIG. 3, the size of one resource block may vary depending on the subcarrier spacing. Additionally, NR defines "Point A" which serves as a common reference point for the resource block grid, as well as common resource blocks, physical resource blocks, etc.

Figure 4:
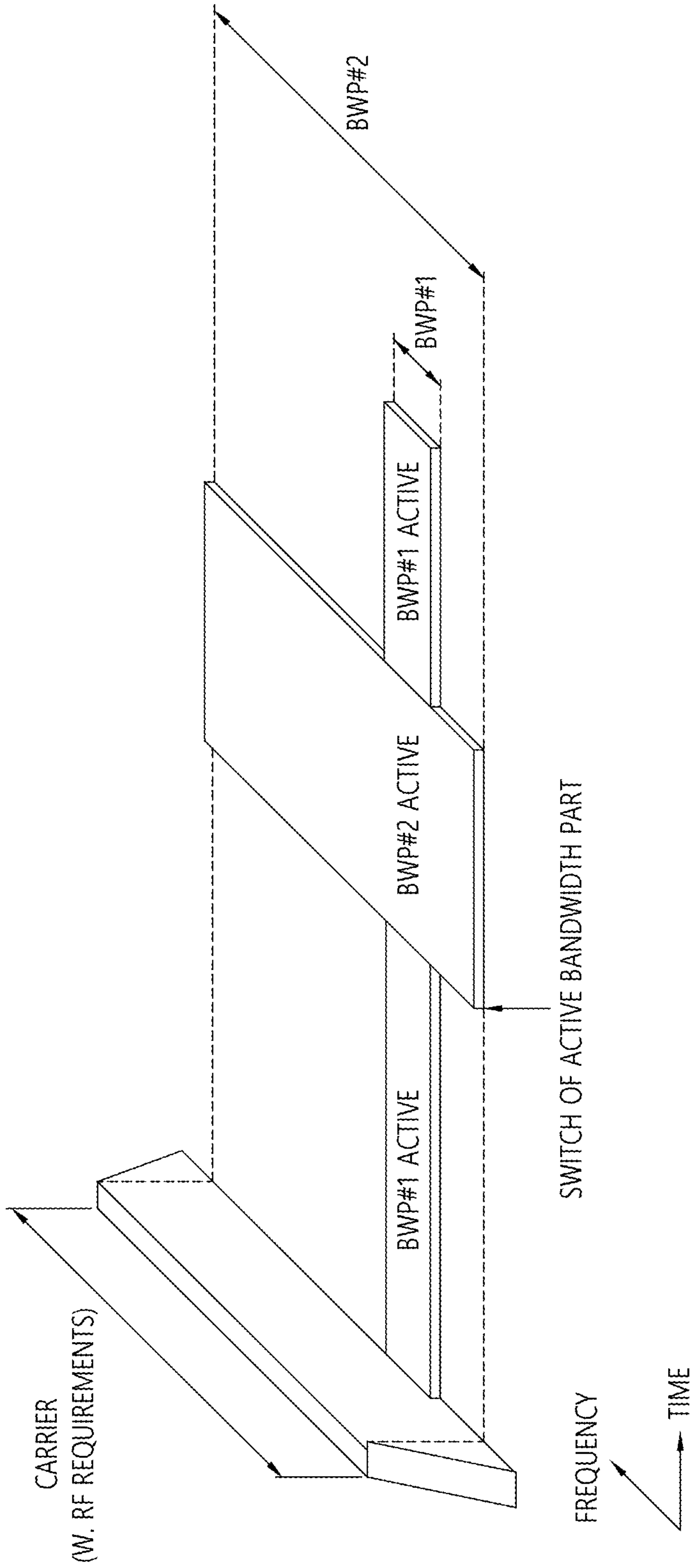
FIG. 4 is a drawing to illustrate a bandwidth part (BWP) supported by a radio access technology to which the present invention may be applied.

FIG. 4 is a diagram illustrating the bandwidth part supported by radio access technology to which the present invention may be applied.

In NR, unlike LTE where the carrier bandwidth is fixed at 20 MHz, the maximum carrier bandwidth is set from 50 MHz to 400 MHz depending on the subcarrier spacing. Therefore, it is not assumed that all UEs will use this entire carrier bandwidth. Consequently, in NR, a bandwidth part (BWP) within the carrier bandwidth can be designated for use by the UE, as shown in FIG. 4. Furthermore, the bandwidth part is associated with a single numerology and comprises a subset of contiguous common resource blocks, which can be dynamically activated over time. A UE may have up to four bandwidth parts configured for each of uplink and downlink, and data is transmitted and received using the bandwidth part that is active at a given time.

For paired spectrum, uplink and downlink bandwidth parts are set independently, while for unpaired spectrum, downlink and uplink bandwidth parts are paired to share a center frequency to avoid unnecessary frequency re-tuning between downlink and uplink operations.

<NR Initial Access>

In NR, the UE performs cell discovery and random access procedures to access to the base station and conduct communication.

Cell discovery is the process of synchronizing the UE to the cell of the base station, obtaining the physical layer cell ID, and obtaining system information by using the synchronization signal block (SSB) transmitted by the base station.

Figure 5:
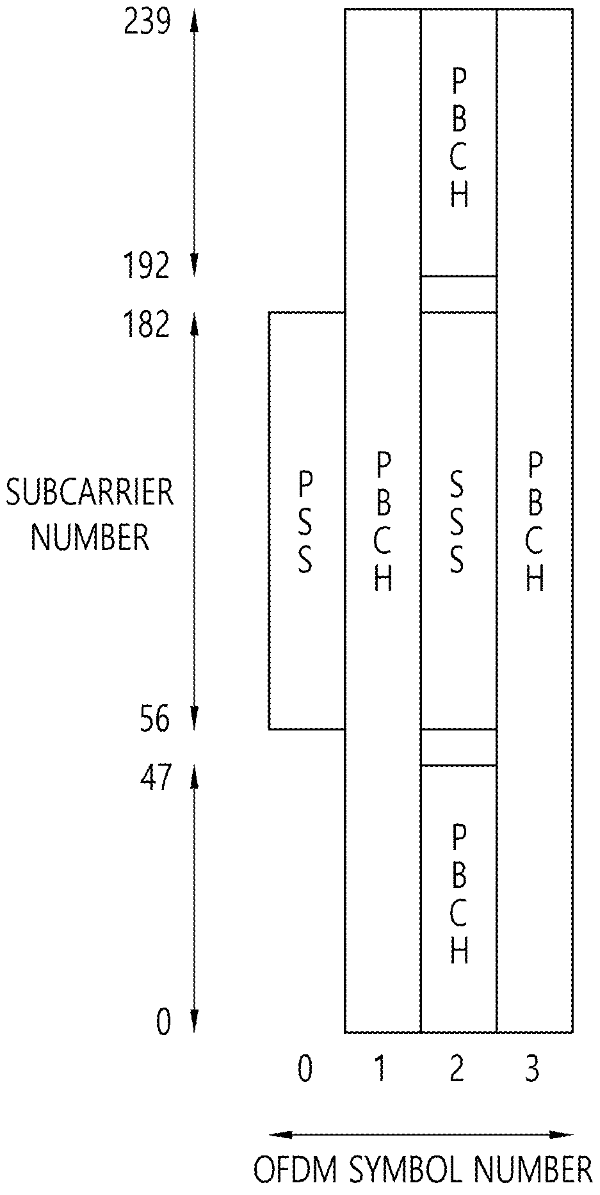
FIG. 5 is an exemplary drawing of a synchronization signal block (SSB) in radio access technology to which the present invention may be applied.

FIG. 5 is an exemplary drawing of a synchronization signal block in a radio access technology to which the present invention may be applied.

Referring to FIG. 5, the SSB consists of a Primary Synchronization Signal (PSS) and Secondary Synchronization Signal (SSS), each occupying one symbol and 127 subcarriers, and a PBCH spanning three OFDM symbols and 240 subcarriers.

The UE receives SSBs by monitoring SSBs in the time and frequency domain.

An SSB may be transmitted up to 64 times in a 5 ms period. Multiple SSBs are transmitted in different transmission beams within a 5 ms time period, and the UE performs detection assuming that an SSB is transmitted every 20 ms, based on the specific one beam used for transmission. The number of beams that can be used for SSB transmission within a 5 ms time window may increase with higher frequency bands. For example, up to four SSB beams can be transmitted below 3 GHz, up to eight in frequency bands from 3 to 6 GHz, and up to 64 different beams can be used to transmit SSB in frequency bands above 6 GHz.

A SSB contains two instances in one slot, and the subcarrier spacing determines the starting symbol and number of repetitions within the slot, as shown below.

Unlike SS in conventional LTE, SSBs are not transmitted at the center frequency of the carrier bandwidth, which means that SSBs can be transmitted at non-center locations in the system band, and multiple SSBs can be transmitted in the frequency domain to support wideband operations. Therefore, the UE monitors for SSBs using a synchronization raster, which is a candidate frequency location to monitor for SSBs. The carrier raster, which is the center frequency location information of the channel for initial access, and the synchronization raster are newly defined in NR, and the synchronization raster is widely spaced in frequency compared to the carrier raster, which can support the UE's fast SSB search.

The UE can obtain the MIB through the PBCH of the SSB. The Master Information Block (MIB) contains the minimum information for the UE to receive the remaining system information (RMSI, Remaining Minimum System Information, or SIB1, System Information Block 1) broadcast by the network. The PBCH may also include information about the location of the first DM-RS symbol in the time domain, information for the UE to monitor SIB1 (e.g., SIB1 numerology information, information related to the SIB1 CORESET, search space information, PDCCH related parameter information, etc. Here, the SIB1 numerology information also applies to some messages used in the random access procedure for contacting the base station after the UE has completed the cell discovery procedure. For example, the numerology information of SIB1 may be applied to at least one of messages 1 to 4 for the random access procedure.

The aforementioned RMSI may refer to System Information Block 1 (SIB1), which is broadcast periodically (e.g., 160 ms) by the cell. SIB1 contains the information necessary for the UE to perform the initial random access procedure and is transmitted periodically via PDSCH. In order for the UE to receive SIB1, it must receive the numerology information used to transmit SIB1 over PBCH and the Control Resource Set (CORESET) information used to schedule SIB1. The UE checks the scheduling information for SIB1 using SI-RNTI in CORESET and acquires SIB1 on PDSCH according to the scheduling information. The remaining SIBs except SIB1 may be transmitted periodically or may be transmitted on demand by the UE.

Figure 6:
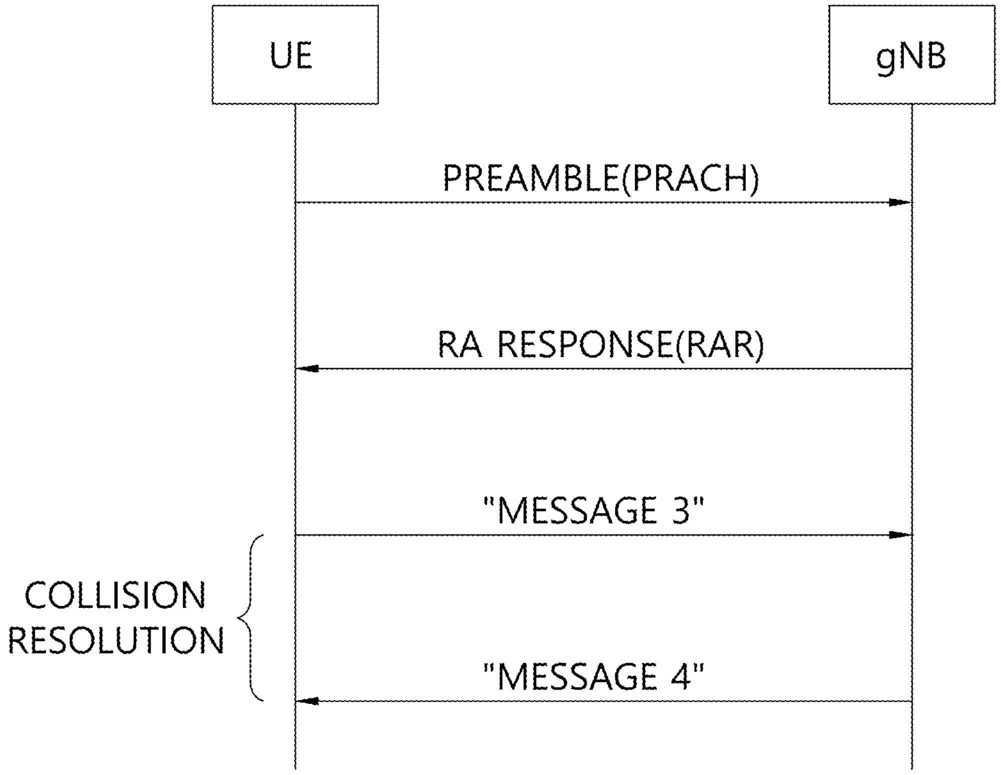
FIG. 6 is a drawing to illustrate a random access procedure in radio access technology to which the present invention may be applied.

FIG. 6 is a drawing to illustrate a random access procedure in radio access technology to which the present invention may be applied.

Referring to FIG. 6, once the cell search is complete, the UE transmits a random access preamble for random access to the base station. The random access preamble is transmitted via PRACH. Specifically, the random access preamble is transmitted to the base station via a PRACH that consists of consecutive radio resources in certain periodically repeated slots. Generally, a contention-based random access procedure is performed when a UE makes its initial access to the cell, and a non-contention-based random access procedure is performed when random access is performed for beam failure recovery (BFR).

The UE receives a random access response to the transmitted random access preamble. The random access response may include a random access preamble identifier (ID), an uplink radio resource (UL Grant), a temporary cell—radio network temporary identifier (TC-RNTI), and a timing advance command (TAC). Since a random access response may contain random access response information for more than one UE, a random access preamble identifier may be included to indicate for which UE the included UL Grant, TC-RNTI, and TAC are valid. The random access preamble identifier may be an identifier for a random access preamble received by the base station. The TAC may be included as information for the UE to adjust its uplink motivation. The random access response may be directed by the random access identifier on the PDCCH, i.e., the Random Access-Radio Network Temporary Identifier (RA-RNTI).

Upon receiving a valid random access response, the UE processes the information contained in the random access response and performs the scheduled transmission to the base station. For example, the UE applies the TAC, stores the TC-RNTI, and, using the UL grant, transmits the data stored in the UE's buffer or newly generated data to the base station. In this case, it must contain information that identifies the UE.

Network Slicing

Network slicing is a new concept applied to 5G mobile communications that enables attributes such as network isolation, customization, and independent management and orchestration to be applied to the Radio Access Network (RAN) and Core Network (CN) of mobile communications by creating and providing end-to-end (E2E) resources and network functions as independent slices for each service.

Communications technology is evolving in a way that combines advances in technologies such as Network Function Virtualization (NFV) and Software Defined Network (SDN) to create network slices that are optimized for each application's application-specific characteristics in one large network.

Network slicing is the creation of end-to-end (E2E) logically separated networks (i.e., slices), including radio access, transport, and 5G core equipment, over a single physical network to provide a dedicated network specialized for different services with different characteristics. In other words, network slicing is a technology that provides the network resources and network functions required for the service requested by the UE in one independent slice.

Figure 7:
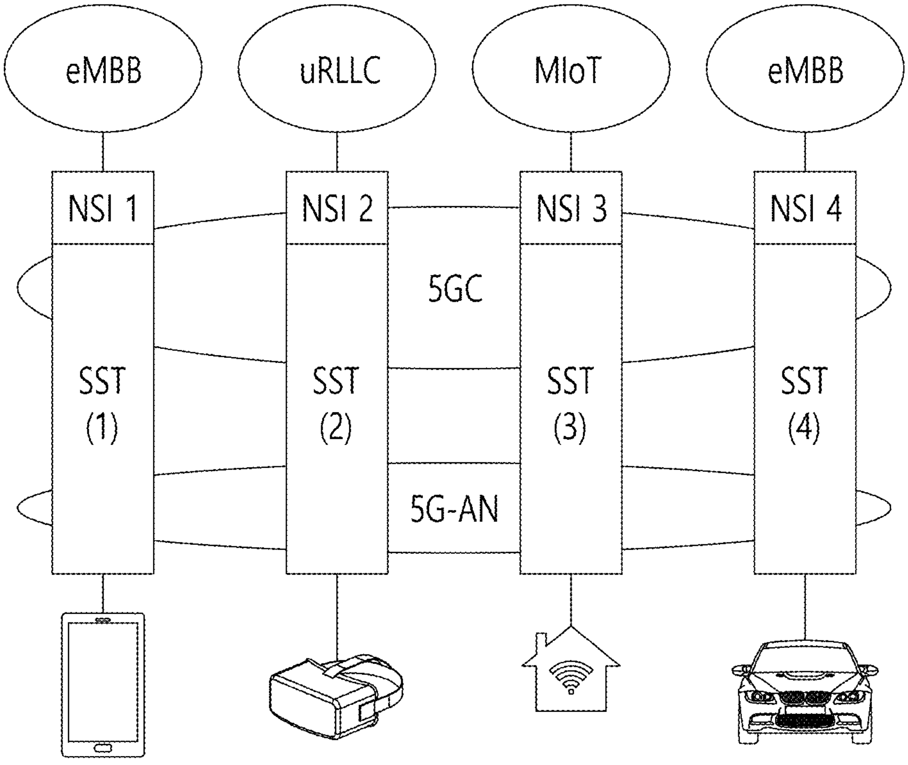
FIG. 7 is a drawing to illustrate a network slice concept according to an embodiment of the present invention.

FIG. 7 is a drawing to illustrate a network slice concept according to an embodiment of the present invention.

Referring to FIG. 7, one network slice comprises an E2E logical network from a UE to a corresponding node (corresponding UE or corresponding application server). Users can access and receive services from the network slice specialized for the application they use (eMBB, URLLC, mMTC, V2X, etc.), In other words, a user's UE can access one or more network slices simultaneously. Each slice can be identified by a slice/service type (SST) that maps to the expected network behavior in terms of services and characteristics.

The mobile operator may allocate network resources appropriate to the service on a per-slice basis or per set of specific slices. The network resources may refer to network functions (NFs) or logical resources provided by NFs, or radio resource allocations, etc. A network slice instance (NSI) may be defined as a set of network function instances and their required resources that form a deployed network slice.

The terms slice, service, network slice, network service, application slice, application service, and the like may be used interchangeably to describe embodiments of the present disclosure.

Random Access Procedure in Network Slicing

In order to switch from the IDLE (RRC_IDLE) state to the ACTIVE (RRC_CONNECTED) state in NR, the UE transmits a random access preamble to the network node for the corresponding RACH occasion (RO), and the network node may utilize the random access preamble to estimate the timing advance (TA) to synchronize with the UE after receiving the random access preamble. The UE transmits random access preamble at different times according to the delay difference with the network node, and the network node sets different random access preamble formats and random access preamble monitoring periods according to different scenarios to detect multiple random access preamble respectively.

When network slicing is applied, the mobile operator may allocate the appropriate network resources for its services on a per-slice basis or per specific set of slices, and the UE may access one or more slices. To do so, the UE may perform a random access procedure on an independent slice-by-slice basis. The RAN slices comprising the end-to-end (E2E) network slicing may be provided separately through a division of frequency bands (e.g., 3.5 GHz, 28 GHz) and/or time, and the frequency and time resources allocated for the random access procedure, or the preamble structure, may be different for each slice. Here, an arrangement for separately transmitting information for each slice is desired.

Sending Individual Control Information for RAN Slicing

Along with net neutrality issues, network slicing technology is becoming more important.

In order to efficiently support a wide variety of services in 5G mobile communications, i.e., to support multiple services with a single system without having to have separate systems for each of the various services, it should be possible to dynamically control resources through slicing. However, RAN slicing presents greater challenges than slicing for the core network (CN). The RAN slicing concept requires that each slice can behave like an independent cell. Each slice should be configured to operate independently and in isolation, ensuring that a failure in one slice does not affect others.

To achieve this, it is important to properly slice the resources managed by a single base station from the upper layers to the physical layer. The upper layers can be implemented on a function-by-function basis, which is relatively easy to address software-wise, but the lower layers can be more difficult to slice in terms of software. For example, a software defined radio (SDR) implementation of a modem for communication may be required.

Accordingly, a phased approach may be considered. One such embodiment may involve implementing the upper layers as Network Function Virtualization (NFV) and implementing the lower layers to perform independent scheduling on a per-service or per-slice basis.

In this context, for RAN slicing, a method is required to separately transmit control information, including system information, for each individual slice.

In a communication system without network slicing, system information (e.g., Master Information Block (MIB), System Information Block1 (SIB1) messages) may contain configuration information (e.g., random access parameters and/or resource information, initial bandwidth part (BWP) information, etc.) that the network node is required to transmit to the UE without consideration of slices. However, to implement RAN slicing, the configuration information or system information needs to be transmitted on a per-slice basis due to the different characteristics required by various types of services or slices. For example, information such as whether the Initial Bandwidth Part (Initial BWP) should be set to a specific BWP for a particular slice or service, random access parameters and/or resource information, or how TDD settings should be configured for a specific slice or service, may be transmitted from the network node to the UE.

In transmitting RAN slicing-related information from the network node to the UE, this information may be conveyed in at least one of the following forms: system information, RRC messages, MAC Control Elements (CEs), or Downlink Control Information (DCI).

According to one aspect, each slice (e.g., eMBB, URLLC, mMTC, V2X slice, etc.) may be assigned a unique ID, allowing different services or slices to be distinguished by their respective slice IDs. For instance, when transmitting system information assigned to each slice, the information may be transmitted based on these slice IDs.

Furthermore, information about RAN slices may be used for handovers between slices. These inter-slice handovers may include: handovers between multiple slices provided by the same base station (or cell), handovers between slices provided by different base stations (or cells), handovers from a base station (or cell) providing a RAN slice to one not providing a RAN slice, or handovers from a base station (or cell) not providing a RAN slice to a specific slice of a base station (or cell) that does provide RAN slices. For these inter-slice handovers, parameters may be predetermined for each slice. Both the network node and the UE may be aware of these parameters during the handover process through the transmission of slice-related information from the network node to the UE Meanwhile, the relevant information for each of the slices may be transmitted from the network node to the UE in a stepwise manner through multiple message forms. For example, the MIB or SIB1 may include slice-specific ID information considering the respective service type (e.g., eMBB, URLLC, mMTC, V2X, etc.), and based on the slice ID assigned to each of the slices, each UE may be configured to further receive information about only one or more slices as required.

According to one aspect, a network node may transmit information about available slices at that node to UEs, for example, based on system information. UEs that find their desired service or slice among the available slices can use those available slices. UEs that do not find their desired service or slice, or do not support RAN slicing, may be configured to use a default slice.

Transmission of System Information

To support RAN slicing, a network node may transmit at least a portion of system information that varies for each slice. The system information may include, for example, MIB or SIB.

According to one aspect, the MIB may be configured to be transmitted identically for different slices, while a different SIB1 (or RMSI) may be transmitted for each slice. For example, the MIB may include RAN slicing operation information. This RAN slicing operation information may indicate whether the network node transmitting the MIB supports RAN slicing, and may consist of, for example, one or two bits. Moreover, the MIB may include resource information for obtaining the SIB1 for each slice. For instance, the MIB may include first resource information for the first slice and second resource information for the second slice. A UE receiving the MIB may, based on at least one of the first and second resource information, receive the SIB1 for the first slice via the first resource information in response to deciding to use a service corresponding to the first slice. Alternatively, the UE may receive the SIB1 for the second slice via the second resource information if it decides to use the service corresponding to the second slice.

According to another aspect, the MIB and SIB1 may be configured to be transmitted commonly for different slices. In one approach, the MIB may include information about RAN slicing support, and may be configured so that different information for each slice is received from SIB1. For example, each of the one or more configuration information or parameters included in SIB1 may be set to have a value for each of the multiple slices.

According to one perspective, different settings may be defined for each slice, and when each slice is assigned a SIB1 (RMSI), each SIB1 may contain different configuration information for its corresponding slice. Alternatively, the different information for multiple slices may all be included within a common SIB1 (RMSI). Here, the slice-specific information may include at least one of the following items.

Information about the Slice resource, primarily in terms of frequency/time.

Initial BWP, CORESET 0, Search Space

Default SCS per Slice

ServingCellConfigCommonSIB

About RACH

In other words, the configuration information for each slice (e.g., eMBB, URLLC, mMTC, V2X, etc.) may include: slice resource information in frequency and time domains, slice-specific initial BWP, CORESET 0, Search Space, slice-specific default SCS (subcarrier spacing, for example, set to 60 kHz for URLLC), ServingCellConfigCommonSIB (defined in RRC messages), and RACH-related information (e.g., for URLLC slices, the RO period may be set relatively short).

The fundamental concept of RAN slicing is to virtually divide a single physical network node system to support various services. Configuration information for slicing network nodes and the core must be set up separately, enabling UEs to be implemented in a way that they can only see the zone or slice to which they belong.

Utilization of Slice Information During Handover Process

One or more network nodes may or may not support RAN slicing. Consequently, different types of handover procedures may be performed depending on whether RAN slicing is supported.

Firstly, there may be a handover procedure between cells that utilize RAN slicing. In this scenario, information about the RAN slice can be included in the handover message. Additionally, RAN slice-related information can be incorporated where necessary in the commands exchanged between cells during the handover. By including RAN slice information in the handover message, a specific UE can be configured to continuously use the slice for its current service. For instance, a UE using the eMBB slice at the first network node can be configured to continue using the eMBB slice even after handover to the second network node.

Conversely, handovers can also occur from cells using RAN slicing to cells that do not. In this case, information about the RAN slice can still be included in the handover message. For example, for parameters that previously used separate RAN slice information in the former cell, a kind of default parameter that corresponds to that parameter can be defined and utilized.

Conversely, a handover may also occur from a cell not using RAN slicing to one that does. In this scenario, the system may be configured to enable the UE to receive information about the RAN slice to be used in the new cell. During the handover, the UE may be informed of the parameters necessary to use the appropriate slice, based on the application and QoS requirements. Alternatively, the system may be configured to allow the UE to receive the required system information when handing over to the new cell, enabling it to use the appropriate slice.

Handovers between cells that do not use RAN slicing can adopt conventional handover procedures.

Control Method for RAN Slicing

According to one aspect, control over RAN slicing is implemented through System Information, RRC messages, MAC CE, or DCI, and can be executed as follows, for example. Firstly, basic configurations can be established using System Information. Additionally, specific settings can be configured via RRC messages as needed, and activation/deactivation can be managed through MAC CE (Control Element). Furthermore, highly dynamic changes can be implemented by incorporating them into the DCI (Downlink Control Information).

Conditional Handover

Conditional Handover (CHO) is defined as a handover executed by the UE(or UE) when one or more predetermined handover conditions are met. Upon receiving the configuration for a conditional handover, the UE initiates the evaluation of execution conditions. The UE ceases evaluating these conditions (for both legacy handover and conditional handover execution) once the handover is executed.

Figure 8:
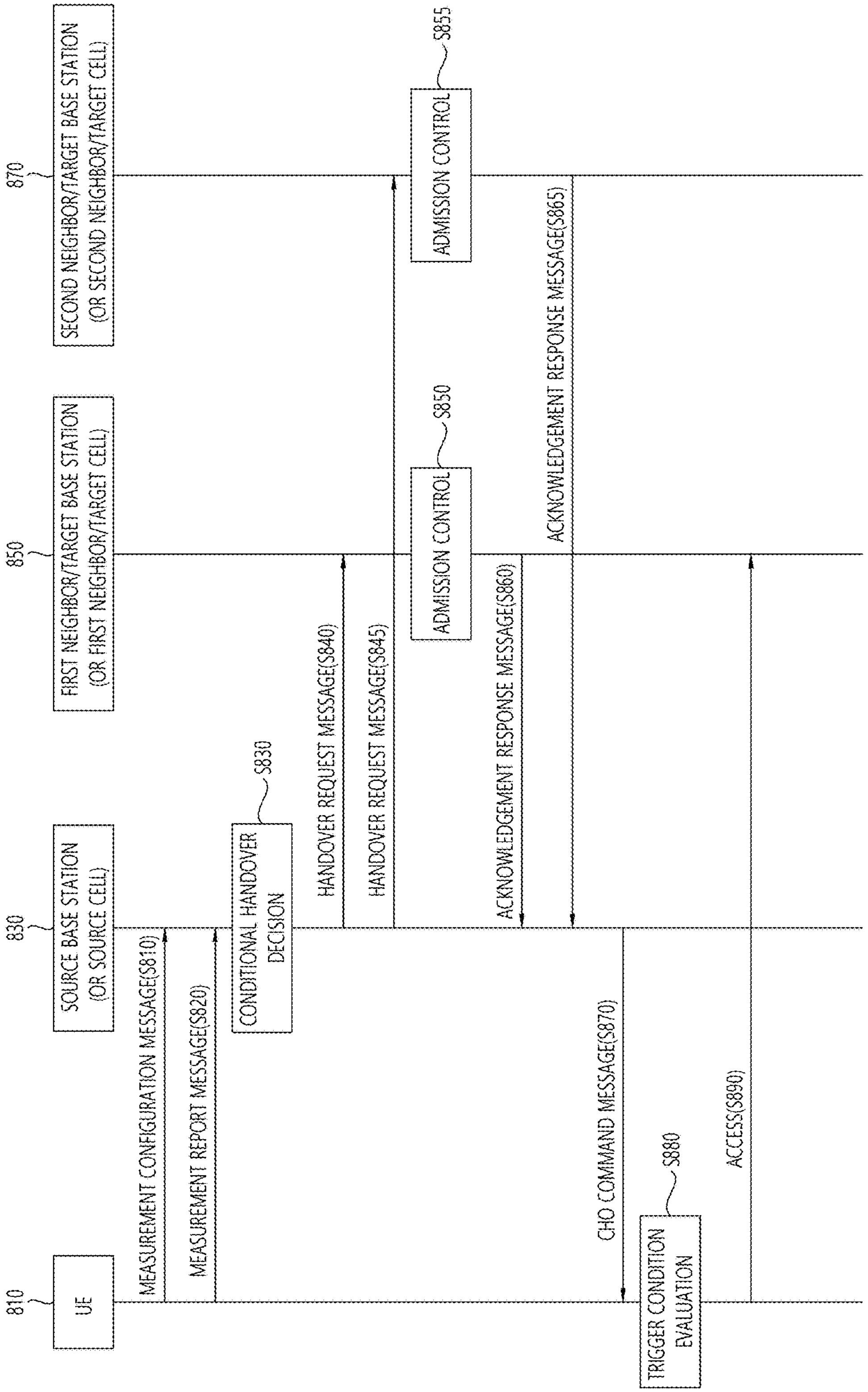
FIG. 8 illustrates a conditional handover method in a communication system according to an embodiment of the present invention.

FIG. 8 illustrates a conditional handover method in a communication system according to an embodiment of the present invention.

Referring to FIG. 8, the communication system may include a User Equipment (UE) 810, a source base station (or cell) 830, a first neighbor/target base station (or cell) 850, and a second neighbor/target base station (or cell) 870.

The UE 810 may correspond to one of the UEs 130-1, 130-2, 130-3, 130-4, 130-5, 130-6 depicted in FIG. 1, while the source base station 830, the first neighbor base station 850, and the second neighbor base station 870 may each correspond to one of the base stations 110-1, 110-2, 110-3, 120-1, 120-2 shown in FIG. 1, respectively.

The UE 810 may be in a connected state with the source base station 830. For instance, the UE 810 may be operating in a Radio Resource Control (RRC) connected state and may be capable of transmitting and receiving data to and from the source base station 830.

Referring to FIG. 8, the source base station 830 transmits a measurement configuration message to the UE 810 (S810).

In this case, the measurement configuration message may include a threshold value for triggering a measurement report message to determine a target cell for handover.

Additionally, the measurement configuration message may include measurement event criteria.

The measurement configuration message sent from the source base station 830 to the UE 810 may be an RRC message (for example, an RRC connection reconfiguration message) that includes measurement configuration information.

At this point, the UE 810 may identify the measurement configuration information by receiving the RRC message from the source base station 830.

Meanwhile, the UE 810 performs measurements on the cell and may determine whether the measurement event criteria are satisfied based on the measurement results and the threshold value. If the measurement event criteria are met, it transmits a measurement report message to the source base station 830 (S820). For example, the UE 810 may send a measurement report to the source base station 830 when the serving cell quality of the source base station 830 falls below a pre-configured threshold value.

Meanwhile, the source base station 830 determines a conditional handover after receiving the measurement report from the UE 810 (S830).

After determining the conditional handover, the source base station 830 sends respective handover request messages to the first and second neighbor base stations 850, 870 (S840, S845).

The first and second neighbor base stations 850, 870 perform admission control procedures, respectively (S850, S855).

Next, when the first and second neighbor base stations 850, 870 accept the handover request from the source base station 830, they send acknowledgment messages to the source base station 830 (S860, S865).

Next, the source base station 830 sends a conditional handover (CHO) command message to the UE 810 (S870).

Subsequently, the UE 810 initiates an evaluation of the trigger conditions to determine whether the trigger conditions for the conditional handover command message received from the source base station 830 are met (S880).

When the UE 810 determines that a trigger condition is met, it applies the corresponding conditional handover command to connect to the target cell (S890). For example, if it is determined to hand over to the first neighbor base station 850, the UE 810 performs the connection by handing over to the first neighbor base station 850.

Conditional Handover Considering RAN Slicing

Meanwhile, RAN slicing may be applied to the UE, source base station, and/or neighboring base stations performing a Conditional Handover. In this embodiment, the process of a UE handing over from the source base station to a neighboring base station while also moving slices is referred to as inter-slice handover, although it may also be called slice mobility or slice change.

For example, a UE may be assumed to handover from an eMBB slice of the source base station to an eMBB slice of a neighboring base station.

According to one aspect, each slice (e.g., including eMBB, URLLC, mMTC, V2X slices) may be assigned a unique ID, and different services or slices may be distinguished by their respective slice IDs. For instance, when transmitting system information assigned to each slice, the information may be transmitted based on these slice IDs.

Meanwhile, information about RAN slices may be used for handovers between slices. Here, inter-slice handovers may include handovers between multiple slices provided by the same base station (or cell), handovers between slices provided by different base stations (or cells), handovers from a base station (or cell) providing a RAN slice to one not providing a RAN slice, or handovers from a base station (or cell) not providing a RAN slice to a specific slice of a base station (or cell) that does provide RAN slices. For inter-slice handovers, parameters may be predetermined for each slice. The network node and UE may be aware of these parameters during the handover process through the transmission of slice-related information from the network node to the UE.

Furthermore, relevant information for each slice may be transmitted from the network node to the UE in a stepwise manner through multiple message forms. For example, the MIB or SIB1 may include slice-specific ID information considering each service type (e.g., eMBB, URLLC, mMTC, V2X). Based on the slice ID assigned to each slice, each UE may be configured to additionally receive information only for one or more required slices.

According to one aspect, a network node may transmit information about available slices at that node to UEs, for example, based on system information. UEs that find their desired service or slice among the available slices can use those available slices. UEs that do not find their desired service or slice, or do not support RAN slicing, may be configured to use a default slice.

Figure 9:
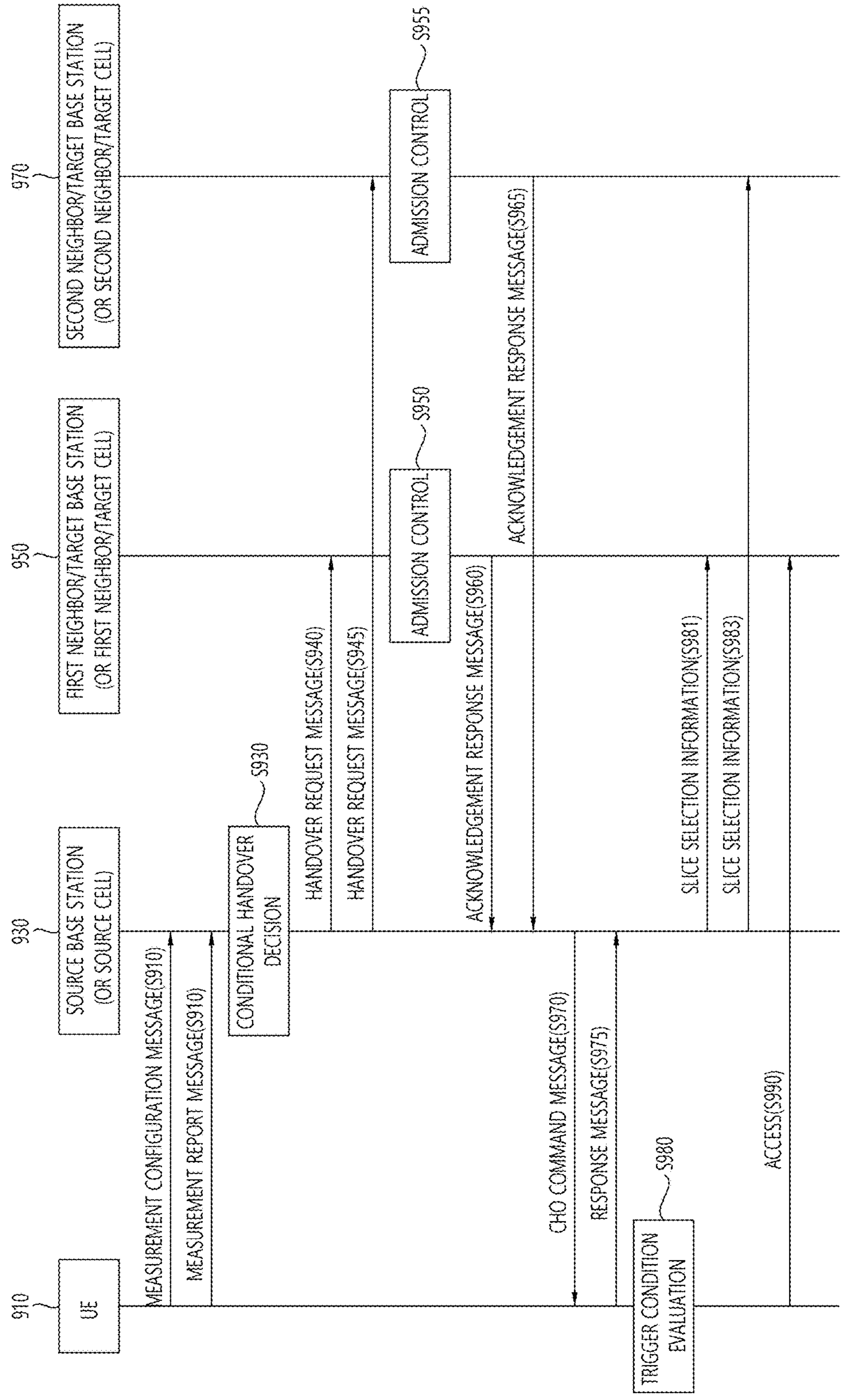
FIG. 9 illustrates a conditional handover method in a communication system according to an embodiment of the present invention.

FIG. 9 illustrates a conditional handover method in a communication system according to an embodiment of the present invention.

Referring to FIG. 9, the communication system may include a UE 910, a source base station (or cell) 930, a first neighbor/target base station (or cell) 950, and a second neighbor/target base station (or cell) 970.

The UE 910 may correspond to one of the UEs 130-1, 130-2, 130-3, 130-4, 130-5, 130-6 depicted in FIG. 1, while the source base station 930, the first neighbor base station 950, and the second neighbor base station 970 may each correspond to one of the base stations 110-1, 110-2, 110-3, 120-1, 120-2 shown in FIG. 1, respectively.

The UE 910 may be in a connected state with the source base station 930. For example, the UE 910 may operate in a Radio Resource Control (RRC) connected state and may be capable of transmitting and receiving data to and from the source base station 930.

In this case, the UE 910 may be connected to one of the slices of the source base station 930. For instance, the UE 910 may be connected to the eMBB slice of the source base station 930.

Referring to FIG. 9, the source base station 930 transmits a measurement configuration message to the UE 910 (S910).

As one example, the measurement configuration message may include a threshold value for triggering a measurement report message to determine a target cell for handover.

As another example, the measurement configuration message may also include measurement event criteria.

As yet another example, the measurement configuration message may be an RRC message (for example, an RRC connection reconfiguration message) that includes measurement configuration information. In this case, the UE 910 may identify the measurement configuration information by receiving the RRC message from the source base station 930.

As a further example, the measurement configuration message may include a request message for the UE 910's network slicing capability information.

However, if the UE 910 is already connected to one of the network slices of the source base station 930 (i.e., the UE 910 is receiving service related to one of the network slices), the measurement configuration message may not include a request message for the UE 910's network slicing capability information.

Meanwhile, the UE 910 performs measurements on the cell, determines whether the measurement event criteria are met based on the measurement results and the threshold, and performs actions according to this determination. If the measurement event criteria are met, the UE 910 transmits a measurement report message to the source base station 930 (S920). For example, the UE 910 may send a measurement report to the source base station 930 when the serving cell quality of the source base station 930 falls below a preconfigured threshold value.

As one example, the measurement report message may include the UE 910's network slicing capability information.

As another example, if the UE 910 is already connected to one of the network slices of the source base station 930 (i.e., the UE 910 is receiving service related to one of the network slices), the measurement report message may not include the UE 910's network slicing capability information.

Meanwhile, the source base station 930 determines a conditional handover after receiving the measurement report from the UE 910 (S930).

After determining the conditional handover, the source base station 930 transmits respective handover request messages to the first neighbor base station 950 and the second neighbor base station 970 (S940, S945).

In this case, the handover request messages transmitted from the source base station 930 to the first neighbor base station 950 and the second neighbor base station 970 may include a request for slice information of the respective neighbor base stations.

The first neighbor base station 950 and the second neighbor base station 970 perform admission control procedures, respectively (S950, S955).

Subsequently, when the first neighbor base station 950 and the second neighbor base station 970 accept the handover request from the source base station 930, they transmit acknowledgment response messages to the source base station 930 (S960, S965).

In this case, the acknowledgment response messages transmitted to the source base station 930 from the first neighbor base station 950 and the second neighbor base station 970 may include information about the network slices admitted to the UE 910 by these neighbor base stations. Alternatively, these acknowledgment response messages may include information about the RAN slices provided by the first neighbor base station 950 and the second neighbor base station 970.

Subsequently, the source base station 930 transmits a conditional handover (CHO) command message to the UE 910 (S970).

This conditional handover command message may include information about the network slices admitted to the UE 910 by the first neighbor base station 950 and the second neighbor base station 970. Alternatively, the conditional handover command message may include information about the RAN slices provided by these neighbor base stations.

The conditional handover command message may be conveyed to the UE from the network node in at least one of the following forms: an RRC message, a MAC Control Element (CE), or Downlink Control Information (DCI).

According to one aspect, each slice (e.g., including eMBB, URLLC, mMTC, V2X slices) may be assigned a unique ID, allowing different services or slices to be distinguished by their respective slice IDs. For instance, information about the network slices admitted to the UE 910 by the first and second neighbor base stations 950, 970, or information about the RAN slices they provide, may be transmitted based on these slice IDs.

Meanwhile, the conditional handover command message may include Single-Network Slice Selection Assistance Information (S-NSSAI).

In this case, the S-NSSAI may include a Slice/Service Type (SST) field and a Service Differentiator (SD) field.

Information about the network slices admitted to the UE 910 by the first and second neighbor base stations 950, 970, or information about the RAN slices they provide, may be included within the SST field.

In this context, the SST field may indicate a slice ID. For example, the slice Type and SST Value may be mapped as shown in Table 2 below.

TABLE 2

| Slice/Service Type | SST Value | Characteristics |
|---|---|---|
| eMBB | 1 | Slice suitable for the handling of 5G enhanced Mobile Broadband. |
| URLLC | 2 | Slice suitable for the handling of ultra-reliable low latency communications |
| MIoT (or mMTC) | 3 | Slice suitable for the handling of massive IoT (or massive Machine-Type Communications) |
| V2X | 4 | Slice suitable for the handling of V2X service. |

Next, the UE 910 transmits a response message to the conditional handover command message to the source base station 930 (S975). This response message may include selection information for a network slice to which the UE will connect when it hands over to either the first neighbor base station 950 or the second neighbor base station 970. For example, the selection information for the network slice may be transmitted based on a slice ID, and may be indicated by Single-Network Slice Selection Assistance Information (S-NSSAI).

In this case, the S-NSSAI may include a Slice/Service Type (SST) field and a Service Differentiator (SD) field. The selection information for the network slice may be included within the SST field.

Here, the SST field may indicate a slice ID. For instance, the slice Type and SST Value may be mapped as shown in Table 2 above.

The selection information for the network slice may be determined based on at least one of: information about the network slices admitted to the UE 910 by the first and second neighbor base stations 950 and 970 (included in the conditional handover command message), and information about the network slice of the source base station 930 to which the UE 910 is currently connected.

For example, if the first or second neighbor base station 950, 970 offers the same type of slice as the network slice of the source base station 930 to which the UE 910 is currently connected, the UE 910 or the source base station 930 may select the same type of network slice.

On the other hand, if the first or second neighbor base stations 950, 970 do not support network slice mode, or if they do not support a network slice accessible to the UE 910, the selection information for the network slice may include information corresponding to "no applicable slice". For example, the SST value may be set to '0' or 'null'.

However, if the first or second neighbor base station 950, 970 supports network slice mode but does not provide the same slice as the network slice of the source base station 930 to which the UE 910 is currently connected, the UE 910 may select a network slice based on a preset priority or randomly select one of the network slices offered by the first or second neighbor base station 950, 970.

The UE 910 begins evaluating the trigger conditions to determine if the conditions for the conditional handover command message received from the source base station 930 are met (S980).

The trigger conditions may be determined based on information about the network slices admitted to the UE 910 by the source base station 930 and/or the first and second neighbor base stations 950, 970, or information about the RAN slices provided by the first and second neighbor base stations 950, 970.

For example, if the UE 910 is connected to one of the slices of the source base station 930, and the first neighbor base station 950 allows access to or provides the same slice as the one the UE 910 is currently connected to, the trigger condition for handover to the first neighbor base station 950 may be set more leniently than the trigger condition for handover to the second neighbor base station 970. For instance, the threshold Reference Signals Received Power (RSRP) or Reference Signal Received Quality (RSRQ) for the UE 910 to handover to the first neighbor base station 950 may be set lower than the threshold RSRP or RSRQ for handover to the second neighbor base station 970.

Meanwhile, if the response message transmitted from the UE 910 to the source base station 930 includes selection information for the network slice, the source base station 930 forwards this selection information to the first and second neighbor base stations 950 and 970 (S981, S983).

At this point, the first and second neighbor base stations 950 and 970 may perform initialization procedures in advance to ensure that the UE 910 can connect to the respective slices when the handover from the source base station 930 is executed.

When the UE 910 determines that the trigger condition is met, it applies the corresponding conditional handover command to connect to the target cell (S990). For instance, if it decides to hand over to the first neighbor base station 950, it performs the access by handing over to that base station.

In this case, when the UE 910 performs access to the target cell corresponding to the satisfied trigger condition, it may directly hand over to the network slice corresponding to the selection information included in the response message sent in step S975.

For example, if the first or second neighbor base stations 950, 970 provide the same network slice as the one in the source base station 930 to which the UE 910 is currently connected, the UE 910 may hand over to the same network slice.

Meanwhile, if the first or second neighbor base stations 950, 970 do not support network slice mode, or if they do not support a network slice accessible to the UE 910, the UE may hand over to the corresponding base station in non-network slice mode or normal mode.

However, if the first or second neighbor base station 950, 970 supports network slice mode but does not provide the same slice as the network slice of the source base station 930 to which the UE 910 is currently connected, the UE 910 may hand over to a network slice selected by priority or random method as determined in step S975.

Figure 10:
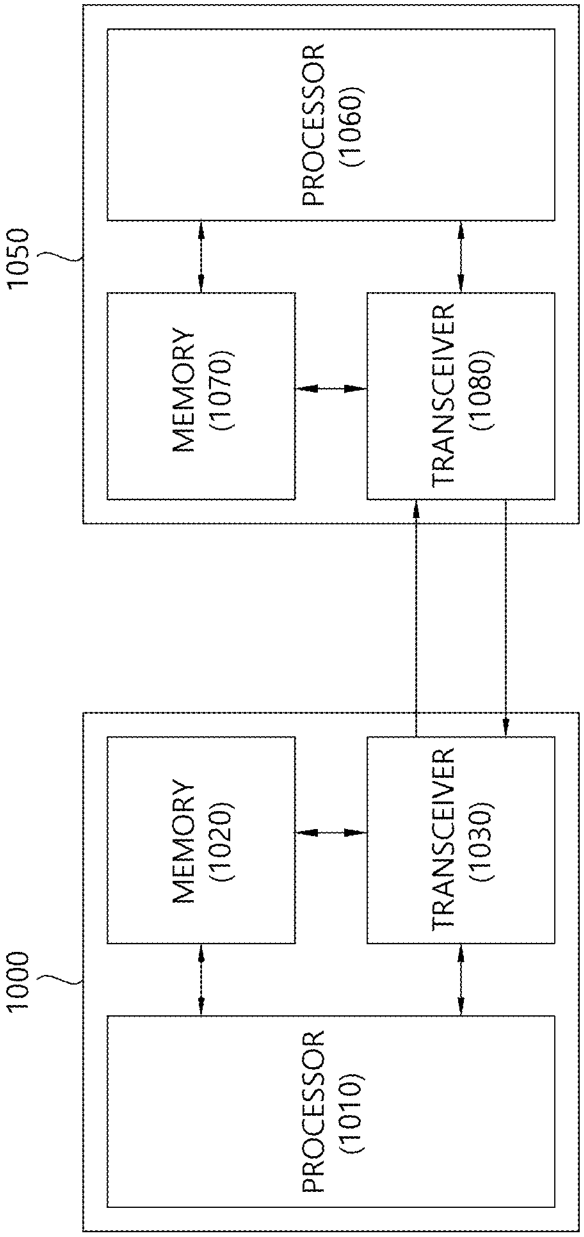
FIG. 10 illustrates a UE and a network node on which embodiments of the present invention are implemented.

FIG. 10 illustrates a UE and a network node implementing embodiments of the present invention.

Referring to FIG. 10, the UE 1000 includes a processor 1010, a memory 1020, and a transceiver 1030. The processor 1010 may be configured to implement the functions, processes, and/or methods described in this specification. Layers of a wireless interface protocol may be implemented in the processor 1010.

The memory 1020 is connected to the processor 1010 and stores various information for driving the processor 1010. The transceiver 1030 is connected to the processor 1010 to transmit wireless signals to the network node 1050 or receive wireless signals from the network node 1050.

The network node 1050 includes a processor 1060, a memory 1070, and a transceiver 1080. In this embodiment, the network node 1050 is a node of a non-terrestrial network, which may include a satellite performing a radio access procedure according to the present disclosure. Alternatively, in this embodiment, the network node 1050 may be a node of a terrestrial network and may include a base station performing a radio access procedure according to the present disclosure.

The processor 1060 may be configured to implement the functions, processes, and/or methods described herein. Layers of a wireless interface protocol may be implemented in the processor 1060. The memory 1070 is associated with the processor 1060 and stores various information for operating the processor 1060. The transceiver 1080 is coupled to the processor 1060 to transmit wireless signals to the UE 1000 or receive wireless signals from the UE 1000.

Processors 1010, 1060 can include application-specific integrated circuits (ASICs), other chipsets, logic circuits, and/or data processing units. The memory 1020, 1070 can include read-only memory (ROM), random access memory (RAM), flash memory, memory cards, storage media, and/or other storage devices. The transceivers 1030, 1080 may include baseband circuitry for processing radio frequency signals. When embodiments are implemented as software, the techniques described above may be implemented as modules (processes, functions, etc.) that perform the functions described above. The modules may be stored in memory 1020, 1070 and executed by processors 1010, 1060. The memory 1020, 1070 may be internal or external to the processor 1010, 1060, and may be coupled to the processor 1010, 1060 by various means well known in the art.

In the exemplary systems described above, methods that may be implemented in accordance with the features of the invention described above have been described with reference to flowcharts. For convenience, the methods have been described as a series of steps or blocks, but the claimed features of the invention are not limited to the order of the steps or blocks, and some steps may occur in a different order or simultaneously with other steps as described above. It will also be understood by those skilled in the art that the steps shown in the flowcharts are not exclusive, and that other steps may be included or one or more steps in the flowcharts may be deleted without affecting the scope of the invention.

What is claimed is:

1. A method for performing a conditional handover (CHO) by a user equipment (UE) in a wireless communication system supporting network slicing, the method comprising:

receiving, from a source base station, a measurement configuration message including a threshold for triggering a measurement report message;

transmitting, to the source base station, the measurement report message based on a measurement event criterion being satisfied according to the threshold;

receiving, from the source base station, a conditional handover command message;

transmitting, to the source base station, a response message to the conditional handover command message; and performing a conditional handover to a neighboring base station when a predetermined condition is satisfied, wherein the conditional handover command message is based on a handover response message from a neighboring base station in response to a handover request message transmitted from the source base station to the neighboring base station, wherein the handover response message from the neighboring base station is based on information about network slices admitted or supported by the neighboring base station, resources for at least one network slice being established by the neighboring base station, wherein the conditional handover command message includes the information about the network slices admitted or supported by the neighboring base station, to be confirmatively applied to the UE, wherein the response message to the conditional handover command message includes an indication of at least one network slice selected from the network slices, and wherein the UE applies the selected at least one network slice corresponding to a configuration included in the conditional handover command message for the neighboring base station after execution and completion of the conditional handover.

2. The method of claim 1, wherein a priority is configured in relation to at least one of the network slices admitted or supported by the neighboring base station.

3. The method of claim 1, wherein the handover request message includes information about at least one network slice related to the UE.

4. The method of claim 3, wherein the handover response message is based on a slice-aware admission control of the neighboring base station considering the at least one network slice related to the UE included in the handover request message.

5. A method for performing a conditional handover (CHO) by a source base station in a wireless communication system supporting network slicing, the method comprising:

transmitting, to a user equipment (UE), a measurement configuration message including a threshold for triggering a measurement report message;

receiving, from the UE, the measurement report message based on a measurement event criterion being satisfied according to the threshold;

transmitting, to a neighboring base station, a handover request message based on the measurement report message;

receiving, from the neighboring base station, a handover response message based on information about network slices admitted or supported by the neighboring base station, resources for at least one network slice being established by the neighboring base station;

transmitting, to the UE, a conditional handover command message including the information about the network slices admitted or supported by the neighboring base station, to be confirmatively applied to the UE, based on the handover response message;

receiving, from the UE, a response message to the conditional handover command message; and performing a conditional handover procedure with the UE when a predetermined condition is satisfied at the UE, wherein the response message to the conditional handover command message includes an indication of at least one network slice selected from the network slices, and wherein the selected at least one network slice corresponding to a configuration included in the conditional handover command message is applied to the UE for the neighboring base station after execution and completion of the conditional handover.

6. The method of claim 5, wherein a priority is configured in relation to at least one of the network slices admitted or supported by the neighboring base station.

7. The method of claim 5, wherein the handover request message includes information about at least one network slice related to the UE.

8. The method of claim 7, wherein the handover response message is based on a slice-aware admission control of the neighboring base station considering the at least one network slice related to the UE included in the handover request message.

9. A user equipment (UE) for performing a conditional handover (CHO) in a wireless communication system supporting network slicing, the UE comprising:

a processor;

a memory; and a transceiver, wherein the processor is configured to:

control the transceiver to receive, from a source base station, a measurement configuration message including a threshold for triggering a measurement report message;

control the transceiver to transmit, to the source base station, the measurement report message based on a measurement event criterion being satisfied according to the threshold;

control the transceiver to receive, from the source base station, a conditional handover command message;

control the transceiver to transmit, to the source base station, a response message to the conditional handover command message; and perform a conditional handover to a neighboring base station when a predetermine condition is satisfied, wherein the conditional handover command message is based on a handover response message from a neighboring base station in response to a handover request message transmitted from the source base station to the neighboring base station, wherein the handover response message from the neighboring base station is based on information about network slices admitted or supported by the neighboring base station, resources for at least one network slice being established by the neighboring base station, wherein the conditional handover command message includes the information about the network slices admitted or supported by the neighboring base station, to be confirmatively applied to the UE, wherein the response message to the conditional handover command message includes an indication of at least one network slice selected from the network slices, and wherein the UE applies the selected at least one network slice corresponding to a configuration included in the conditional handover command message for the neighboring base station after execution and completion of the conditional handover.

10. The UE of claim 9, wherein a priority is configured in relation to at least one of the network slices admitted or supported by the neighboring base station.

11. The UE of claim 9, wherein the handover request message includes information about at least one network slice related to the UE.

12. The UE of claim 11, wherein the handover response message is based on a slice-aware admission control of the neighboring base station considering the at least one network slice related to the UE included in the handover request message.

13. A source base station for performing a conditional handover (CHO) in a wireless communication system supporting network slicing, the source base station comprising:

a processor;

a memory; and a transceiver, wherein the processor is configured to:

control the transceiver to transmit, to a user equipment (UE), a measurement configuration message including a threshold for triggering a measurement report message;

control the transceiver to receive, from the UE, the measurement report message based on a measurement event criterion being satisfied according to the threshold;

control the transceiver to transmit, to a neighboring base station, a handover request message based on the measurement report message;

control the transceiver to receive, from the neighboring base station, a handover response message based on information about network slices admitted or supported by the neighboring base station, resources for at least one network slice being established by the neighboring base station;

control the transceiver to transmit, to the UE, a conditional handover command message including the information about the network slices admitted or supported by the neighboring base station, to be confirmatively applied to the UE, based on the handover response message;

control the transceiver to receive, from the UE, a response message to the conditional handover command message; and perform a conditional handover procedure with the UE when a predetermined condition is satisfied at the UE, wherein the response message to the conditional handover command message includes an indication of at least one network slice selected from the network slices, and wherein the selected at least one network slice corresponding to a configuration included in the conditional handover command message is applied to the UE for the neighboring base station after execution and completion of the conditional handover.

14. The source base station of claim 13, wherein a priority is configured in relation to at least one of the network slices admitted or supported by the neighboring base station.

15. The source base station of claim 13, wherein the handover request message includes information about at least one network slice related to the UE.

16. The source base station of claim 15, wherein the handover response message is based on a slice-aware admission control of the neighboring base station considering the at least one network slice related to the UE included in the handover request message.

* * * * *